UNITED STATES PATENT OFFICE.

CHARLES W. PHELPS, OF COUPEVILLE, WASHINGTON, ASSIGNOR OF ONE-HALF TO DESOTO E. RICHARDSON, OF RIVERSIDE, WASHINGTON.

WELDING.

1,199,020.  Specification of Letters Patent.  Patented Sept. 19, 1916.

No Drawing.  Application filed June 6, 1914.  Serial No. 843,365.

*To all whom it may concern:*

Be it known that I, CHARLES W. PHELPS, a citizen of the United States, residing at Coupeville, in the county of Island, State of Washington, have invented a new and useful Improvement in Welding, of which the following is a specification.

My invention relates to welding, and the nature thereof consists in an improved compound composed of the ingredients hereinafter set forth and in substantially the proportions specified.

My object is to overcome the inefficiency of welds which is not infrequent and which is due in many instances, to conditions beyond the control of the skill of the workman. In order to produce an efficient weld there must be a proper welding heat, a suitable flux, and proper hammering or pressure so as to produce a complete union of the metals—that homogeneity which gives high and uniform endurance under severe stress; and although it has been found that two pieces of metal may, for all practical purposes, be united and made integral by heat alone without the application of pressure, I prefer using the hammer or other pressure as is generally practised.

My invention pertains particularly to the welding of steel and iron, each to itself or each to the other, by means of a product technically termed "volcanic ash". The "volcanic ash" best suited for this purpose, so far as my knowledge and experience extend, is that obtained from the State of Washington. An analysis of that particular "volcanic ash" reveals the fact that it contains silica, alumina, iron oxid, and lime, which are not contained in other volcanic ash that has come under my observation or if contained therein the proportions thereof are dissimilar for as good result is not achievable. To this fact may be attributed the special adaptability of the "volcanic ash" of the State of Washington for use in a flux for welding purposes.

My extensive experiments have demonstrated the fact that a flux composed of the ingredients herein described and claimed is very efficient in welding the metals named.

I understand that the "volcanic ash" used by me in my process is specifically called scoria or tufa although various names have been applied without much discrimination to deposits of volcanic origin. An analysis of said "volcanic ash" discloses that it contains the following ingredients in substantially the proportions stated: silica, 68.18%; alumina, 23.63%; iron oxid, 2.40%; lime, 1.69%.

In carrying out this invention I form a compound by pulverizing the "volcanic ash" and adding to nine parts thereof one part of common salt (chlorid of sodium).

In practice, I heat to a cherry red the metals to be welded, and then coat with the said compound the parts to be united either by sprinkling it thereon or by dipping the parts into it; the metals are then reheated to a white heat to thoroughly flux the compound, when pressure, by hammering or otherwise, is applied at the point of weld.

I do not confine myself to any particular source of heat, for it may be an electric current, blow pipe or such other as will produce the requisite temperature.

From my practical experience of many years as a smith at the forge and the anvil, I have found that my process for welding has an advantage over other processes for like purpose, particularly in its simplicity and efficiency.

I claim as my invention—

1. A fluxing compound for welding and working iron and steel of which volcanic ash—substantially as specified—is the essential constituent.

2. A fluxing compound for welding and working iron and steel composed of a volcanic ash—substantially as specified—and chlorid of sodium.

3. A fluxing compound for welding and working iron and steel composed of nine parts of volcanic ash—substantially as specified—and one part of chlorid of sodium.

CHARLES W. PHELPS.

Witnesses:
D. W. CRADDOCK,
DORIS CRADDOCK.